J. RANCEVAN.
Ice Sleigh.

No. 73,198.

Patented Jan'y 7, 1868.

Witnesses:
Theo Tusche
J. A. Servia

Inventor:
John Rancevan
Per Munn & Co.
Attorneys

United States Patent Office.

JOHN RANCEVAU, OF CARTHAGE, OHIO.

Letters Patent No. 73,198, dated January 7, 1868.

IMPROVEMENT IN ICE-SLEIGH.

The Schedule referred to in these Letters Patent and making part of the same.

TO ALL WHOM IT MAY CONCERN:

Be it known that I, JOHN RANCEVAU, of Carthage, in the county of Hamilton, and State of Ohio, have invented a new and improved Ice-Sleigh; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to furnish an improved ice-sleigh, so constructed and arranged as to be propelled rapidly and conveniently over the ice by those riding in said sleigh; and it consists in the construction, combination, and arrangement of the various parts, as hereinafter more fully described.

Figure 1:
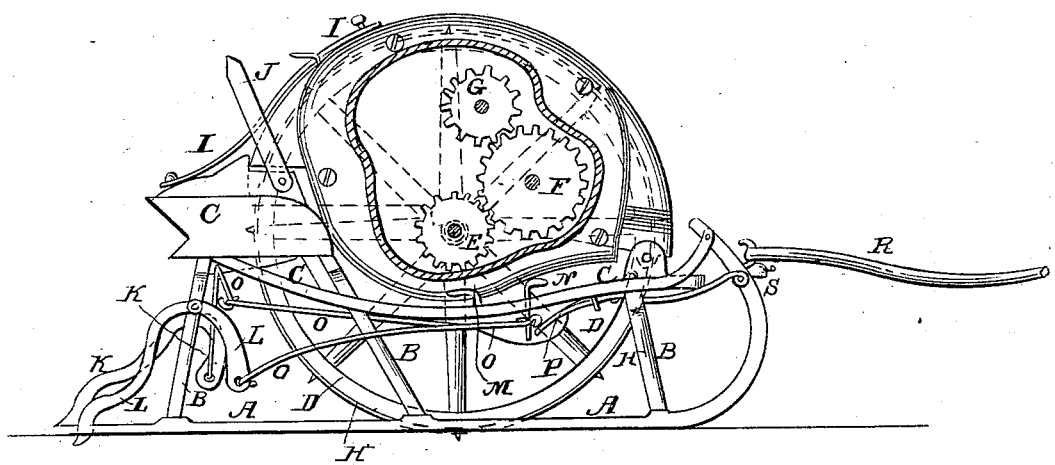
Figure 1 is a side view of my improved ice-sleigh, part being broken away to show the construction.
Figure 2:
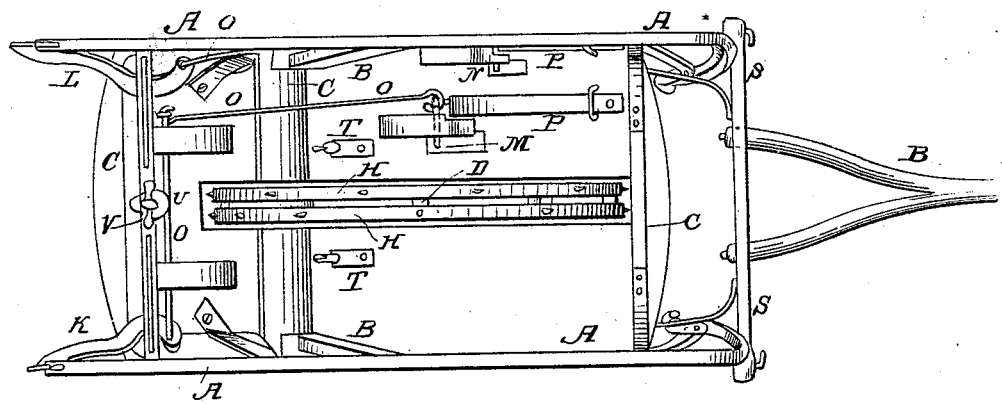
Figure 2 is an under side view of the same.

A are the runners, and B the knees of the sleigh. C is the body or box of the sleigh, which is slotted longitudinally for the reception of the drive-wheel D. The rim of the wheel D is made double, as shown in fig. 2, the parts being secured to each other, and kept in their proper relative positions, by the interposition of thin blocks. The ends of the felloes are secured to each other by iron caps, to give strength to the rim of the wheel. The outer ends of the spokes of the wheel are attached to the parts of the rim alternately. The journals of the wheel revolve in bearings in a framework, the forward end of which is hinged to the forward part of the sleigh-body, so that the wheel D may be raised when not required for use. To one of the journals of the wheel D is attached a gear-wheel, E, the teeth of which mesh into the teeth of the gear-wheel F. The teeth of the gear-wheel F mesh into the teeth of the gear-wheel G, to the projecting end of one of the journals of which is attached the crank, by means of which motion is imparted to the wheel D.

If desired, the gear-wheels E F G may be so arranged that the axis of the gear-wheel G may be without the rim of the wheel D. This allows a crank to be attached to each end of the journal.

The wheels, and the framework to which they are pivoted, are encased with some light material, to prevent the slush from being thrown upon those riding in the sleigh, by the revolution of the wheel D.

H is a rubber tire placed upon the rim of the wheel D, through which project spuds or spikes, attached to the felloes of the said wheel D. The rubber tire, by its elasticity, cleans off the ice from the spikes whenever released from the compression caused by the weight of the sleigh, and the spuds and rubber prevent the wheel from slipping upon the surface of the ice, however smooth it may be.

I is a rubber strap, one end of which is attached to the frame of the sleigh, and its other end adjustably attached to the casing of the wheel D, so as to hold the said wheel down upon the ice with any desired pressure, and, at the same time, to allow it to accommodate itself to any roughness or unevenness of the surface of the ice.

J is a brace, the lower end of which is pivoted to the frame of the sleigh, so that it may be swung forward to support the wheel D, when lifted above the ice.

K and L are brakes, the upper parts of which are pivoted to the rear knees of the sleigh. The rear ends of the brakes pass down through slots in the rear ends of the runners, or in plates attached to the rear ends of the said runners. The forward ends of the brakes K and L are connected with the foot-levers M and N by the connecting-rods O, so that either of the brakes may be operated independently, to guide or steer the sleigh, or together, to stop its motion, as may be required.

P are springs, attached to the bottom or frame of the sleigh, and the free ends of which press against shoulders or arms formed upon or attached to the foot-levers M and N, to bring said levers back to their place when released from the feet of the operator, so as to raise the brakes K and L from the surface of the ice.

R is the tongue of the sleigh, the rear end of which is made branched, as shown in fig. 2, and hooks upon hooks attached to the draught-bar S of the sleigh, so as to be readily detachable when required.

T are hooks, attached to the bottom of the sleigh, upon which the ends of the branches of the tongue are hooked, the fork of the tongue fitting over the block U, attached to the rear beam of the sleigh, in which position the said tongue is secured by the thumb-nut V. The sleigh may thus be drawn or pushed to and from the ice, as may be most convenient.

If desired, a pair of shafts or a tongue may be attached to the draught-bar S, and the sleigh be drawn by horses in the ordinary manner.

Having thus described my invention, what I claim as new, and desire to secure by Letters Patent, is—

1. The wheel D, having its bearings in the hinged frame, in combination with the elastic strip I, whereby the wheel is held upon the ice and permitted to conform to its irregularities, as herein set forth, for the purpose specified.

2. The construction and arrangement of the pivoted brakes K L, connecting-rods O, foot-levers M and N, and springs P, substantially as described, for the purpose specified.

3. The combination and arrangement of the spur-wheel D, hung in the hinged frame, gear-wheels E F G, elastic strip I, brace J, springs P, foot-levers M N, connecting-rods O, pivoted brakes K L, block U, and thumb-nut V, substantially as described, for the purpose specified.

The above specification of my invention signed by me, this 5th day of March, 1867.

JOHN RANCEVAU.

Witnesses:
   R. A. MORTEN,
   FIELDING N. ALCORN.